(12) United States Patent
Lee et al.

(10) Patent No.: US 11,197,134 B2
(45) Date of Patent: Dec. 7, 2021

(54) METHOD AND DEVICE FOR ENHANCING V2P COMMUNICATION IN WIRELESS COMMUNICATION SYSTEM

(71) Applicant: LG ELECTRONICS INC., Seoul (KR)

(72) Inventors: Youngdae Lee, Seoul (KR); Hanbyul Seo, Seoul (KR); Jaewook Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 348 days.

(21) Appl. No.: 16/088,536

(22) PCT Filed: Mar. 31, 2017

(86) PCT No.: PCT/KR2017/003561
§ 371 (c)(1),
(2) Date: Sep. 26, 2018

(87) PCT Pub. No.: WO2017/171477
PCT Pub. Date: Oct. 5, 2017

(65) Prior Publication Data
US 2020/0304968 A1    Sep. 24, 2020

Related U.S. Application Data

(60) Provisional application No. 62/317,504, filed on Apr. 2, 2016.

(51) Int. Cl.
*H04W 4/40* (2018.01)
*H04W 76/28* (2018.01)
(Continued)

(52) U.S. Cl.
CPC .......... *H04W 4/40* (2018.02); *H04W 72/005* (2013.01); *H04W 72/04* (2013.01); *H04W 76/28* (2018.02)

(58) Field of Classification Search
CPC ..... H04W 4/40; H04W 76/28; H04W 72/005; H04W 72/04; H04W 72/0446;
(Continued)

(56) References Cited

U.S. PATENT DOCUMENTS

2016/0157211 A1* 6/2016 Kato ............... H04W 16/32
455/450
2016/0174219 A1* 6/2016 Patil ............... H04L 5/0055
370/329
(Continued)

FOREIGN PATENT DOCUMENTS

KR    1020100038226    4/2010
KR    1020100043216    4/2010
(Continued)

OTHER PUBLICATIONS

PCT International Application No. PCT/KR2017/003561, International Search Report dated Jul. 13, 2017, 4 pages.
(Continued)

*Primary Examiner* — Ayaz R Sheikh
*Assistant Examiner* — Louis Samara
(74) *Attorney, Agent, or Firm* — Lee Hong Degerman Kang & Waimey (57) ABSTRACT

In vehicle-to-everything (V2X) communication or vehicle-to-pedestrian (V2P) communication, a first user equipment (UE) transmits, at a transmission timing, first data for a specific logical channel, and determines a reception timing window on the basis of the transmission timing. A second UE transmits second data in a specific time interval that is within the reception timing window or is prior to the reception timing window, and the first UE monitors the reception timing window in order to receive the second data.

12 Claims, 9 Drawing Sheets

(51) Int. Cl.
*H04W 72/00* (2009.01)
*H04W 72/04* (2009.01)

(58) Field of Classification Search
CPC ..... H04W 74/06; H04W 16/32; H04W 24/02; H04W 72/1263; H04W 74/0833; H04L 5/0053
See application file for complete search history.

(56) References Cited

U.S. PATENT DOCUMENTS

2016/0381681 A1* 12/2016 Nogami ............ H04W 72/0446
 370/280
2017/0215160 A1* 7/2017 Lohr ..................... H04L 5/0094
2017/0325255 A1* 11/2017 Xu .......................... H04L 43/00
2018/0027424 A1* 1/2018 Chen ..................... H04W 24/02
 455/450
2018/0049060 A1* 2/2018 Fujishiro ............... H04W 28/06
2019/0053251 A1* 2/2019 Loehr ............... H04W 72/1263

FOREIGN PATENT DOCUMENTS

| KR | 1020150015295 | 2/2015 | |
|---|---|---|---|
| WO | 2015016646 | 2/2015 | |
| WO | 2015020498 | 2/2015 | |
| WO | 2016015350 | 2/2016 | |
| WO | WO-2017146534 A1 * | 8/2017 | ........ H04W 52/0277 |

OTHER PUBLICATIONS

3rd Generation Partnership Project; Technical Specification Group Radio Access Network; Evolved Universal Terrestrial Radio Access (E-UTRA); Medium Access Control (MAC) protocol specification (Release 13), 3GPP TS 36.321 V13.0.0, Dec. 2015, 5 pages.

* cited by examiner

METHOD AND DEVICE FOR ENHANCING V2P COMMUNICATION IN WIRELESS COMMUNICATION SYSTEM

CROSS-REFERENCE TO RELATED APPLICATIONS

This application is the National Stage filing under 35 U.S.C. 371 of International Application No. PCT/KR2017/003561, filed on Mar. 31, 2017, which claims the benefit of U.S. Provisional Application No. 62/317,504, filed on Apr. 2, 2016, the contents of which are all hereby incorporated by reference herein in their entirety.

BACKGROUND OF THE INVENTION

Field of the Invention

The present invention relates to wireless communication and, more particularly, to a method and device for enhancing vehicle-to-pedestrian (V2P) communication in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

LTE-based vehicle-to-everything (V2X) is urgently desired from market requirement as widely deployed LTE-based network provides the opportunity for the vehicle industry to realize the concept of 'connected cars'. The market for vehicle-to-vehicle (V2V) communication in particular is time sensitive because related activities such as research projects, field test, and regulatory work are already ongoing or expected to start in some countries or regions such as US, Europe, Japan, Korea, and China.

Discontinuous reception (DRX) is a method that conserves battery consumption by allowing a UE to discontinuously receive a downlink channel. That is, if DRX is configured, then the UE tries to receive physical downlink control channel (PDCCH), which is a downlink channel, only during a given time interval but does not try to receive PDCCH during other times. In this case, a time interval during which the UE should try to receive PDCCH is referred to as an "On Duration". A DRX cycle specifies the periodic repetition of the On Duration. There are two types of DRX cycle depending on their length: long DRX cycle and short DRX cycle. The long DRX cycle may minimize the battery consumption of the UE, whereas the short DRX cycle may minimize a data transmission delay.

In vehicle-to-pedestrian (V2P) communication, which is a type of V2X communication, a vehicle UE and a pedestrian UE communicate with each other. The battery consumption of the pedestrian UE should be kept as low as possible due to its characteristics. Thus, the use of DRX when the pedestrian UE performs V2P communication may be discussed.

SUMMARY OF THE INVENTION

The present invention provides a method and device for enhancing vehicle-to-pedestrian (V2P) communication in a wireless communication system. The present invention provides a method and device for configuring a timing for receiving a V2P message, i.e. a reception timing window for a V2P message.

In an aspect, a method for receiving data by a user equipment (UE) in a wireless communication system is provided. The method includes transmitting first data for a specific logical channel in a transmitting timing, determining a reception timing window based on the transmitting timing, and monitoring the reception timing window to receive second data.

In another aspect, a user equipment (UE) in a wireless communication system is provided. The UE includes a memory, a transceiver, and a processor, operably coupled to the memory and the transceiver, that controls the transceiver to transmit first data for a specific logical channel in a transmitting timing, determines a reception timing window based on the transmitting timing, and monitors the reception timing window to receive second data.

It is possible to efficiently receive V2P messages without delays, while minimizing battery consumption.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA.

The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
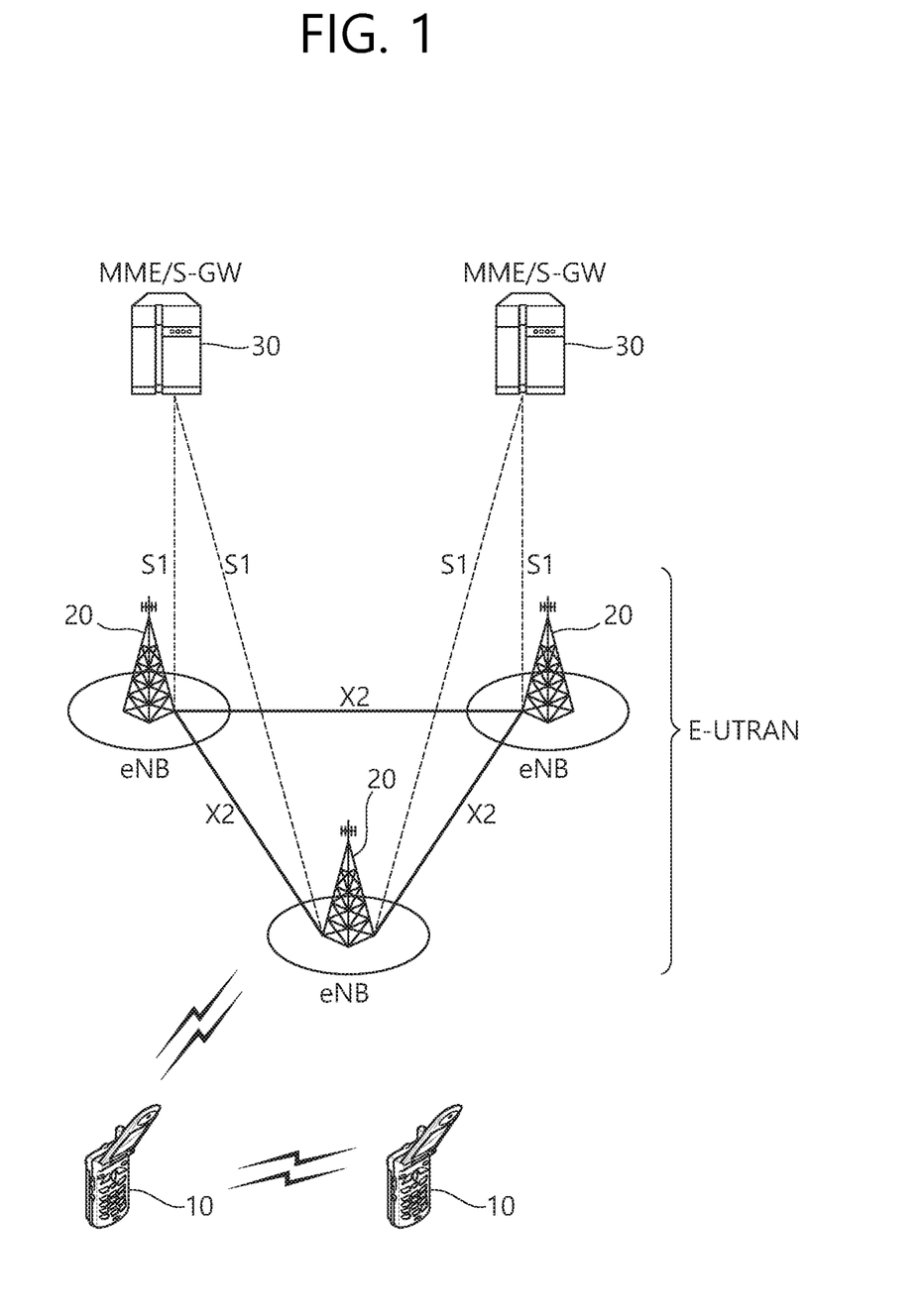
FIG. 1 shows LTE system architecture.

FIG. 1 shows LTE system architecture. Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an Si interface.

Figure 2:
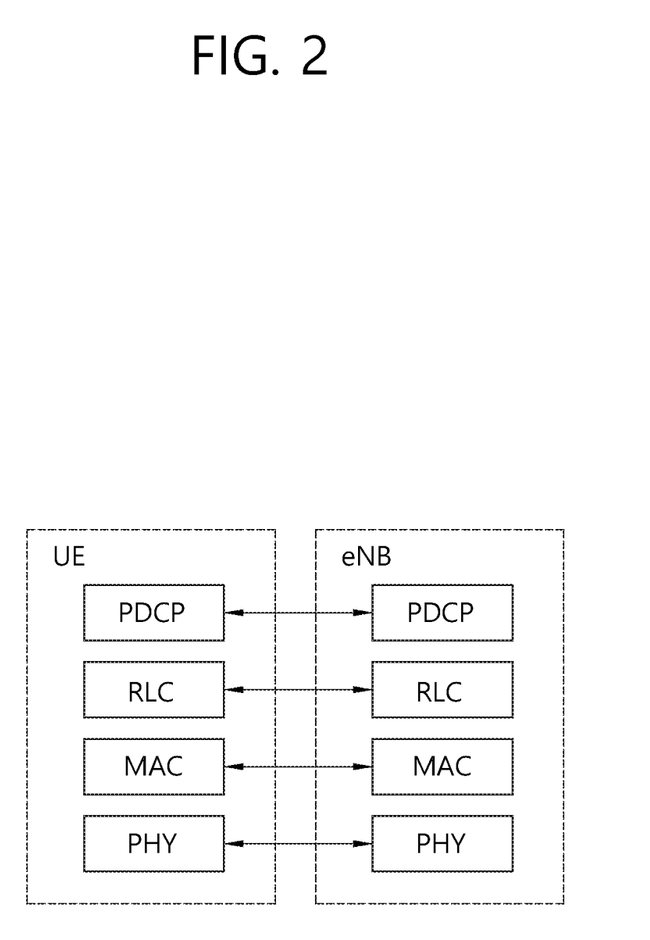
FIG. 2 shows a block diagram of a user plane protocol stack of an LTE system.
Figure 3:
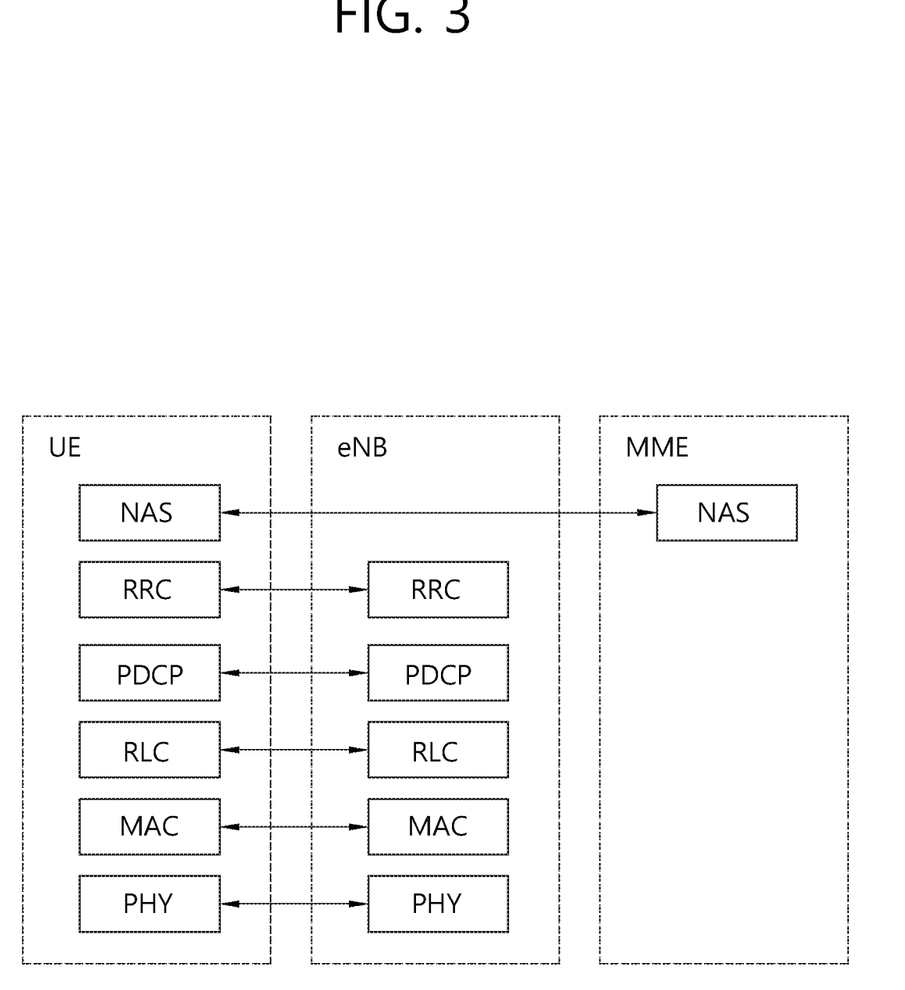
FIG. 3 shows a block diagram of a control plane protocol stack of an LTE system.

FIG. 2 shows a block diagram of a user plane protocol stack of an LTE system. FIG. 3 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 2, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 3, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, and an uplink shared channel (UL-SCH) for transmitting user traffic or control signals. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both UL and DL. The MTCH is a point-to-multipoint downlink channel for transmitting traffic data from the network to the UE.

UL connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Sidelink is described. Sidelink is a UE to UE interface for sidelink communication and sidelink discovery. The Sidelink corresponds to the PC5 interface. Sidelink communication is AS functionality enabling ProSe direct communication, between two or more nearby UEs, using E-UTRA technology but not traversing any network node. Sidelink discovery is AS functionality enabling ProSe direct discovery, using E-UTRA technology but not traversing any network node. Sidelink uses UL resources and physical channel structure similar to UL transmissions. Sidelink transmission uses the same basic transmission scheme as the UL transmission scheme. However, sidelink is limited to single cluster transmissions for all the sidelink physical channels. Further, sidelink uses a 1 symbol gap at the end of each sidelink subframe.

Figure 4:
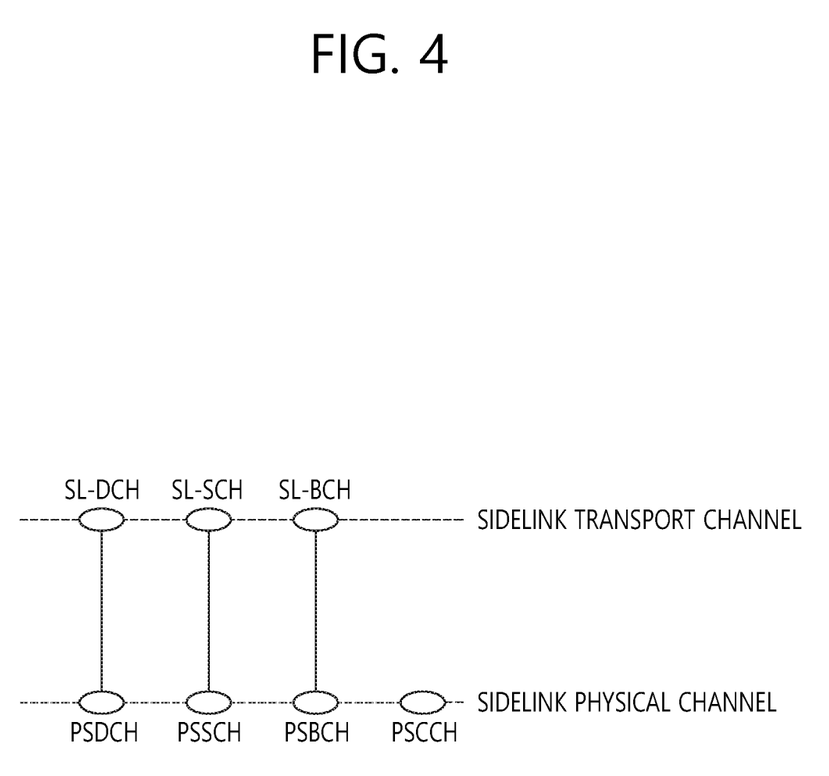
FIG. 4 shows mapping between sidelink transport channels and sidelink physical channels.

FIG. 4 shows mapping between sidelink transport channels and sidelink physical channels. Referring to FIG. 4, a physical sidelink discovery channel (PSDCH) carrying sidelink discovery message from the UE is mapped to a sidelink discovery channel (SL-DCH). A physical sidelink shared channel (PSSCH) carrying data from a UE for sidelink communication is mapped to a sidelink shared channel (SL-SCH). A physical sidelink broadcast channel (PSBCH) carrying system and synchronization related information, transmitted from the UE, is mapped to a sidelink broadcast channel (SL-BCH). A physical sidelink control channel (PSCCH) carries control from a UE for sidelink communication.

Figure 5:
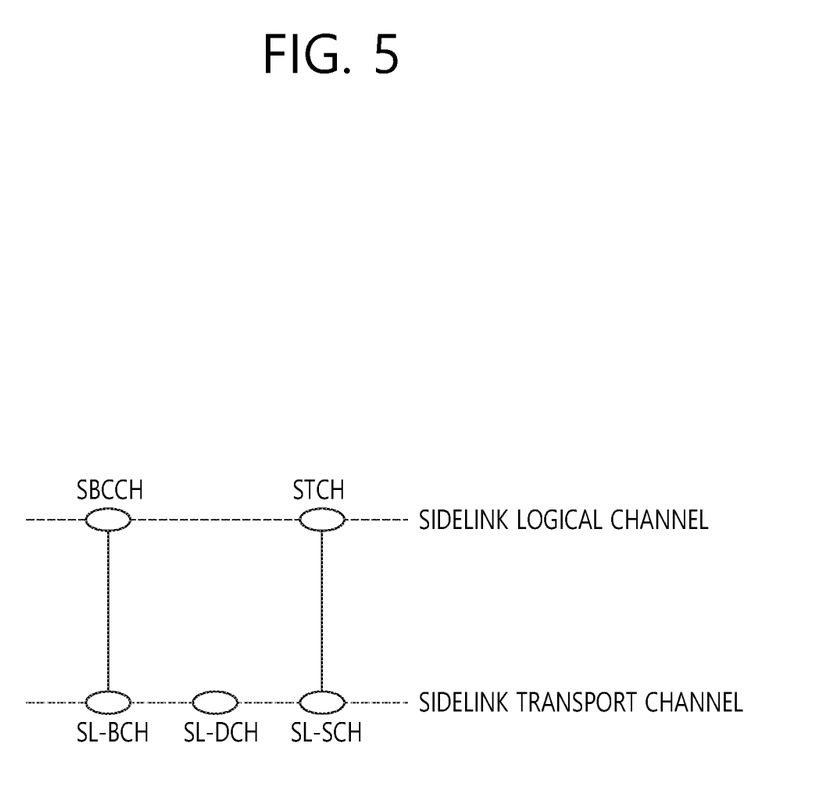
FIG. 5 shows mapping between sidelink logical channels and Sidelink transport channels.

FIG. 5 shows mapping between sidelink logical channels and Sidelink transport channels. Referring to FIG. 5, SL-BCH is mapped to a sidelink broadcast control channel (SBCCH). The SBCCH is a sidelink channel for broadcasting sidelink system information from one UE to other UE(s). This channel is used only by sidelink communication capable UEs. SL-SCH is mapped to a sidelink traffic channel (STCH). The STCH is a point-to-multipoint channel, for transfer of user information from one UE to other UEs. This channel is used only by sidelink communication capable UEs.

Figure 6:
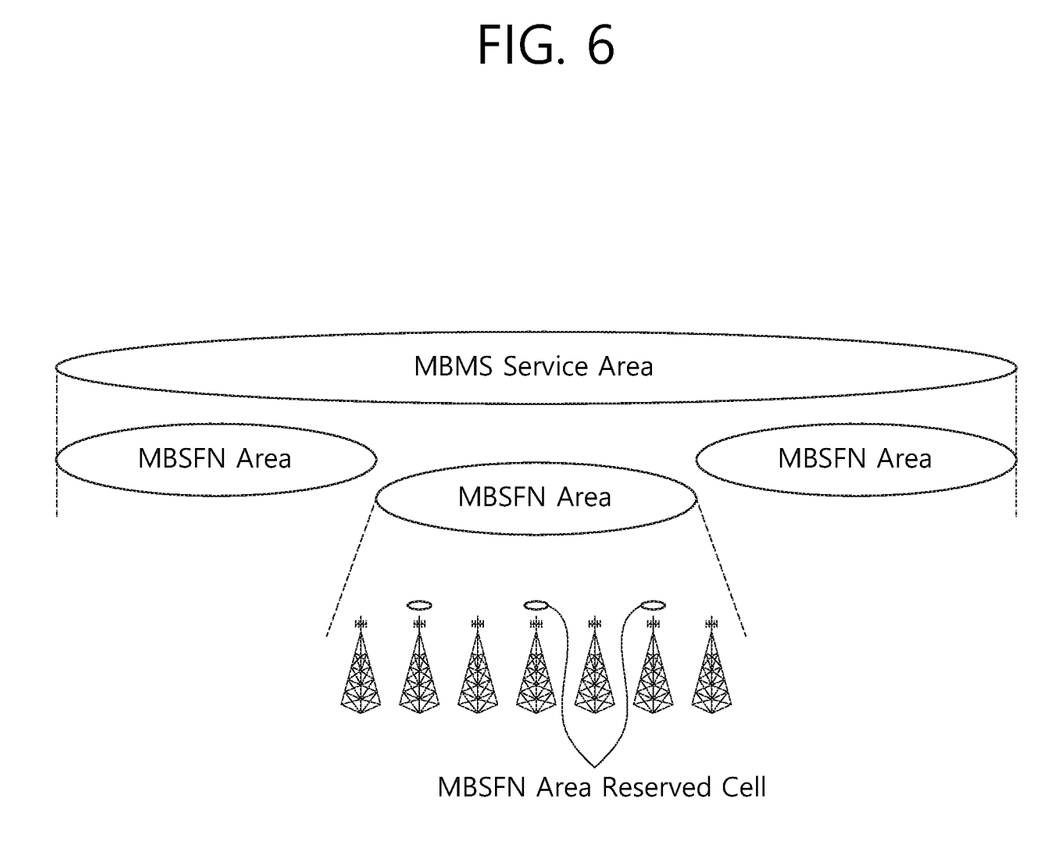
FIG. 6 shows MBMS definitions.

FIG. 6 shows MBMS definitions. For MBMS, the following definitions are introduced.

Multicast-broadcast single-frequency network (MBSFN) synchronization area: an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas.

MBSFN transmission or a transmission in MBSFN mode: a simulcast transmission technique realized by transmission of identical waveforms at the same time from multiple cells. An MBSFN Transmission from multiple cells within the MBSFN area is seen as a single transmission by a UE.

MBSFN area: an MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e. when it knows which MBSFN area applies for the service(s) it is interested to receive.

MBSFN area reserved cell: A cell within a MBSFN area which does not contribute to the MBSFN transmission. The cell may be allowed to transmit for other services but at restricted power on the resource allocated for the MBSFN transmission.

Synchronization sequence: Each SYNC protocol data unit (PDU) contains a time stamp which indicates the start time of the synchronization sequence. For an MBMS service, each synchronization sequence has the same duration which is configured in the broadcast multicast service center (BM-SC) and the multi-cell/multicast coordination entity (MCE).

Synchronization period: The synchronization period provides the time reference for the indication of the start time of each synchronization sequence. The time stamp which is provided in each SYNC PDU is a relative value which refers to the start time of the synchronization period. The duration of the synchronization period is configurable.

Transmission of a MBMS in E-UTRAN uses either MBSFN transmission or single-cell point-to-multipoint (SC-PTM) transmission. The MCE makes the decision on whether to use SC-PTM or MBSFN for each MBMS session.

Single-cell transmission of MBMS (i.e. SC-PTM transmission) is characterized as follows.
  MBMS is transmitted in the coverage of a single cell;
  One single-cell MCCH (SC-MCCH) and one or more single-cell MTCH (SC-MTCH(s)) are mapped on DL-SCH;
  Scheduling is done by the eNB;
  SC-MCCH and SC-MTCH transmissions are each indicated by a logical channel specific radio network temporary identity (RNTI) on PDCCH (there is a one-to-one mapping between temporary mobile group identity (TMGI) and group RNTI (G-RNTI) used for the reception of the DL-SCH to which a SC-MTCH is mapped);
  A single transmission is used for DL-SCH (i.e. neither blind HARQ repetitions nor RLC quick repeat) on which SC-MCCH or SC-MTCH is mapped.

Multi-cell transmission of MBMS (i.e. MBSFN transmission) is characterized as follows.
  Synchronous transmission of MBMS within its MBSFN area;
  Combining of MBMS transmission from multiple cells is supported;
  Scheduling of each MCH is done by the MCE;
  A single transmission is used for MCH (i.e. neither blind HARQ repetitions nor RLC quick repeat);
  A single transport block (TB) is used per TTI for MCH transmission, that TB uses all the MBSFN resources in that subframe;
  MTCH and MCCH can be multiplexed on the same MCH and are mapped on MCH for p-t-m transmission;
  The MAC subheader indicates the LCID for MTCH and MCCH;
  The MBSFN synchronization area, the MBSFN area, and the MBSFN cells are semi-statically configured e.g. by operation and maintenance (O&M);
  MBSFN areas are static, unless changed by O&M (i.e. no dynamic change of areas);

Multiple MBMS services can be mapped to the same MCH and one MCH contains data belonging to only one MBSFN area. An MBSFN area contains one or more MCHs. An MCH specific MCS is used for all subframes of the MCH that do not use the MCS indicated in BCCH. All MCHs have the same coverage area.

Hereinafter, a discontinuous reception (DRX) is described. It may be referred to as Section 5.7 of 3GPP TS 36.321 V13.0.0 (2015-12).

Figure 7:
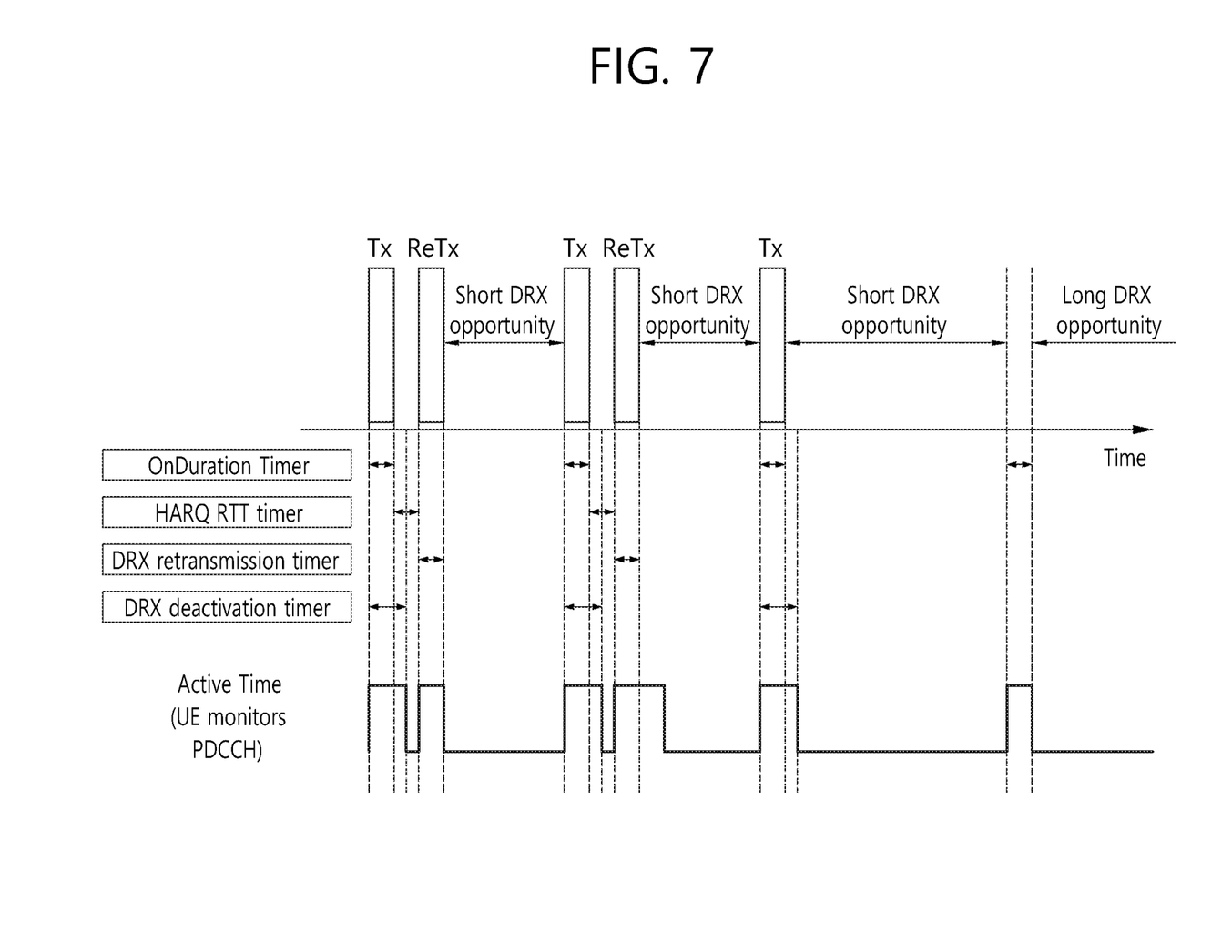
FIG. 7 shows a DRX operation method.

FIG. 7 shows a DRX operation method. Referring to FIG. 7, the UE attempts to receive a PDCCH in On Duration. In addition, when the UE receives the PDCCH in On Duration, additional transmission or retransmission may occur in a time interval other than the On Duration, so it is necessary to attempt to receive the PDCCH even in this time period. That is, the UE should attempt to receive the PDCCH in the time period during which the On Duration timer (onDurationTimer) for managing On Duration, the DRX deactivation timer (drx-Inactivity Timer) for managing deactivation, or the DRX retransmission timer (drx-Retransmission Timer) for managing retransmission is running. In addition, the UE should attempt to receive the PDCCH when the UE is performing random access, or and receiving an UL grant upon transmitting a scheduling request (SR). The active time may be referred to as an active time during which the UE should attempt to receive the PDCCH, and the active time may include an On Duration that periodically attempts to receive the PDCCH and a time interval that attempts to receive the PDCCH when the event occurs.

Specifically, DRX operation of the UE is as follows.

The MAC entity may be configured by RRC with a DRX functionality that controls the UE's PDCCH monitoring activity for the MAC entity's cell RNTI (C-RNTI), transmit power control physical uplink control channel RNTI (TPC-PUCCH-RNTI), TPC physical uplink shared channel RNTI (TPC-PUSCH-RNTI), semi-persistent scheduling (SPS)C-RNTI (if configured), enhanced interference mitigation and traffic adaptatio (eIMTA)-RNTI (if configured) and sidelink RNTI (SL-RNTI) (if configured). When in RRC_CONNECTED, if DRX is configured, the MAC entity is allowed to monitor the PDCCH discontinuously using the DRX operation. Otherwise, the MAC entity monitors the PDCCH continuously. RRC controls DRX operation by configuring the timers onDurationTimer, drx-InactivityTimer, drx-RetransmissionTimer (one per DL HARQ process except for the broadcast process), the longDRX-Cycle, the value of the drxStartOffset and optionally the drxShortCycleTimer and shortDRX-Cycle. A HARQ RTT timer per DL HARQ process (except for the broadcast process) is also defined.

When a DRX cycle is configured, the active time includes the time while:
onDurationTimer or drx-InactivityTimer or drx-RetransmissionTimer or mac-ContentionResolutionTimer is running; or
a scheduling request is sent on PUCCH and is pending; or
an uplink grant for a pending HARQ retransmission can occur and there is data in the corresponding HARQ buffer; or
a PDCCH indicating a new transmission addressed to the C-RNTI of the MAC entity has not been received after successful reception of a random access response for the preamble not selected by the MAC entity.

When DRX is configured, the MAC entity shall for each subframe:
1> if a HARQ RTT Timer expires in this subframe and the data of the corresponding HARQ process was not successfully decoded:
2> start the drx-RetransmissionTimer for the corresponding HARQ process.
1> if a DRX command MAC control element (CE) or a long DRX command MAC CE is received:
2> stop onDurationTimer;
2> stop drx-InactivityTimer.
1> if drx-InactivityTimer expires or a DRX command MAC CE is received in this subframe:
2> if the short DRX cycle is configured:
3> start or restart drxShortCycleTimer;
3> use the short DRX Cycle.
2> else:
3> use the long DRX cycle.
1> if drxShortCycleTimer expires in this subframe:
2> use the long DRX cycle.
1> if a long DRX command MAC CE is received:
2> stop drxShortCycleTimer;
2> se the long DRX cycle.
1> If the short DRX Cycle is used and [(SFN*10)+subframe number] modulo (shortDRX-Cycle)=(drxStartOffset) modulo (shortDRX-Cycle); or
1> if the long DRX Cycle is used and [(SFN*10)+subframe number] modulo (long DRX-Cycle)=drxStartOffset:
2> start onDurationTimer.
1> during the active time, for a PDCCH-subframe, if the subframe is not required for uplink transmission for half-duplex frequency division duplex (FDD) UE operation, if the subframe is not a half-duplex guard subframe and if the subframe is not part of a configured measurement gap and if the subframe is not part of a configured sidelink discovery gap for reception; or
1> during the active time, for a subframe other than a PDCCH-subframe and for a UE capable of simultaneous reception and transmission in the aggregated cells, if the subframe is a downlink subframe indicated by a valid eIMTA L1 signalling for at least one serving cell not configured with schedulingCellId and if the subframe is not part of a configured measurement gap and if the subframe is not part of a configured sidelink discovery gap for reception; or
1> during the active time, for a subframe other than a PDCCH-subframe and for a UE not capable of simultaneous reception and transmission in the aggregated cells, if the subframe is a downlink subframe indicated by a valid eIMTA L1 signalling for the special cell (SpCell) and if the subframe is not part of a configured measurement gap and if the subframe is not part of a configured sidelink discovery gap for reception:
2> monitor the PDCCH;
2> if the PDCCH indicates a DL transmission or if a DL assignment has been configured for this subframe:
3> start the HARQ RTT Timer for the corresponding HARQ process;
3> stop the drx-RetransmissionTimer for the corresponding HARQ process.
2> if the PDCCH indicates a new transmission (DL, UL or SL):
3> start or restart drx-InactivityTimer.
1> in current subframe n, if the MAC entity would not be in active time considering grants/assignments/DRX command MAC CEs/long DRX command MAC CEs received and scheduling request sent until and including subframe n-5 when evaluating all DRX active time conditions, type-0-triggered sounding reference signal (SRS) shall not be reported.
1> if CQI masking (cqi-Mask) is setup by upper layers:
2> in current subframe n, if onDurationTimer would not be running considering grants/assignments/DRX command MAC CEs/long DRX command MAC CEs received until and including subframe n-5 when evaluating all DRX active time conditions, CQI/precoding matrix indicator (PMI)/radnk indicator (RD/precoding type indicator (PTI) on PUCCH shall not be reported.
1> else:
2> in current subframe n, if the MAC entity would not be in active time considering grants/assignments/DRX command MAC CEs/long DRX command MAC CEs received and scheduling request sent until and including subframe n-5 when evaluating all DRX active time conditions, CQI/PMI/RI/PTI on PUCCH shall not be reported.

Regardless of whether the MAC entity is monitoring PDCCH or not, the MAC entity receives and transmits HARQ feedback and transmits type-1-triggered SRS when such is expected.

Hereinafter, a DRX for SC-PTM is described. It may be referred to as Section 5.7a of 3GPP TS 36.321 V13.0.0 (2015-12). In addition to the conventional DRX operation, the UE may perform DRX operation for SC-PTM.

Each G-RNTI of the MAC entity may be configured by RRC with a DRX functionality that controls the UE's PDCCH monitoring activity for this G-RNTI. When in RRC_IDLE or RRC_CONNECTED, if DRX is configured, the MAC entity is allowed to monitor the PDCCH for this G-RNTI discontinuously using the DRX operation. Otherwise, the MAC entity monitors the PDCCH for this G-RNTI continuously. For each G-RNTI of the MAC entity, RRC controls its DRX operation by configuring the timers onDurationTimerSCPTM, drx-InactivnyTimerSCPTM, the SC-MTCH-SchedulingCycle and the value of the SC-MTCH-SchedulingOffset. The DRX operation for SC-PTM is performed independently for each G-RNTI and independently from the conventional DRX operation.

When DRX is configured for a G-RNTI, the active time includes the time while:
onDuranonTimerSCPTM or drx-InactivnyTimerSCPTM is running.

When DRX is configured for a G-RNTI, the MAC entity shall for each subframe f or this G-RNTI:

1> if [(SFN*10)+subframe number] modulo (SC-MTCH-SchedulingCycle)=SC-MTCH-SchedulingOffset:
2> start onDurationTimerSCPTM
1> during the active time, for a PDCCH-subframe:
2> monitor the PDCCH;
2> if the PDCCH indicates a DL transmission:
3> start or restart drx-InactivnyTimerSCPTM.

Vehicle-to-everything (V2X) communication is described. V2X communication contains the three different types, i.e. vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, road side unit (RSU), and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and vehicle-to-network (V2N) service. V2V service is a type of V2X service, where both parties of the communication are UEs using V2V application. V2I service is a type of V2X service, where one party is a UE and the other party is an RSU both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application. V2N service is a type of V2X service, where one party is a UE and the other party is a serving entity, both using V2N applications and communicating with each other via LTE network entities.

In V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, etc.

In V2I, the UE supporting V2I applications sends application layer information to RSU. RSU sends application layer information to a group of UEs or a UE supporting V2I applications.

In V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X service. The UE supporting V2P applications transmits application layer information. Such information can be broadcast by a vehicle with UE supporting V2X Service (e.g. warning to pedestrian), and/or by a pedestrian with UE supporting V2X Service (e.g. warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

A pedestrian UE (for example, a smartphone carried by a user) may need to monitor potential downlink V2X transmissions from an eNB and/or potential sidelink V2X transmissions from nearby vehicles periodically or near-continuously. On the other hand, the pedestrian UE, when in the sidelink or in RRC_CONNECTED, may need to send V2X messages in the uplink periodically (e.g., every 100 ms). From the perspective of power saving, the pedestrian UE should not monitor sidelink transmissions or downlink broadcasts from nearby potential vehicles. For example, while at home, the user does not need to monitor V2X messages sent from vehicles.

V2P (i.e., received by the pedestrian UE) may be triggered by P2V (i.e., sent by the pedestrian UE). Accordingly, in the case of Uu, E-UTRAN may send filtered V2X messages to the pedestrian UE via downlink unicast only when the pedestrian UE sends V2X messages via UL unicast. In the case of PC5, the application layer of a vehicle may send V2X messages to the pedestrian UE in the sidelink based on V2X messages received from the pedestrian UE only when the pedestrian UE gets close to the vehicle.

Assuming that the pedestrian UE can periodically monitor a particular subframe, i.e. the active time of DRX operation, the transmission of filtered V2X messages may be delayed until the next active time. Reducing DRX cycle may be taken into consideration in order to reduce service delays. In that case, however, power-saving gains cannot be achieved. The power-saving gains and service delays, due to the DRX cycle length, are in a trade-off relationship.

To overcome the aforementioned problems, a method for enhancing V2P/V2X communications proposed by the present invention will be described below. According to the present invention, a timing for receiving a V2P/V2X message, i.e. a reception timing window for receiving a V2P/V2P message, may be configured, and a UE may receive a V2P/V2X message within the reception timing window. A reception timing for the UE may be aligned with a transmission timing for the UE. For example, when the UE sends a message, the UE may expect a nearby vehicle to send a message in a specific time window. That is, the UE may additionally monitor a time window aligned with a P2V transmission as the active time of DL DRX operation. This mechanism may also apply to sidelink. That is, in the downlink, E-UTRAN may send a message within a time window aligned with a transmission timing for the UE, and the UE may consider the time window in DRX as active time. In the sidelink, the vehicle may send a message within a time window aligned with a transmission timing for the UE, and the UE may monitor only the time window in the sidelink. Thus, since the DRX cycle is not reduced, power-saving gains can be achieved, and at the same time V2X messages can be stably received without service delays.

More specifically, when the DRX cycle is configured, a first UE may include a time window within an active time for DL reception. Alternatively, when DRX is configured for a DL broadcast on PDSCH or PMCH or for a G-RNTI, the first UE may include a time window within an active time for DL reception. A time window may be created when a UE sends data in the uplink or sidelink through a specific logical channel(s). The time window may include at least one subframe, starting from a subframe which is at a time offset from the time at which the UE sends data in the uplink or sidelink through a specific logical channel(s). The specific logical channel may be a logical channel specific to V2X communication, V2V communication, or V2P communication. A second UE may receive data from the first UE through the logical channel specific to V2X communication, V2V communication, or V2P communication. The second UE may send data toward the first UE within a time window (for example, in the sidelink), or may send data toward the first UE in a specific time interval prior to the time window (for example, in the uplink, or in advance since the data passes through a network). The first UE may monitor a time window to receive data, and may receive data that the second UE starts transmitting within the time window. Once the second UE transmits data via the sidelink, the first UE may configure a time window for the sidelink and monitor only the time window in the sidelink.

Figure 8:
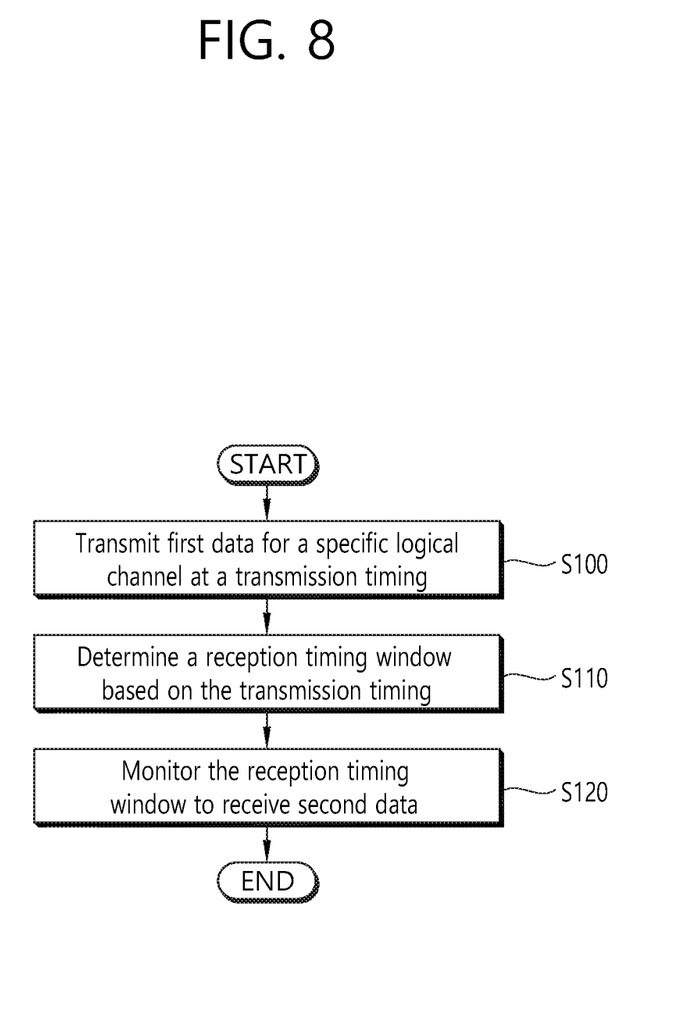
FIG. 8 shows an example of a method for receiving data by a UE according to an exemplary embodiment of the present invention.

FIG. 8 shows an example of a method for receiving data by a UE according to an exemplary embodiment of the present invention. The UE may be either a vehicle UE or a pedestrian UE.

In step S100, the UE sends first data for a specific logical channel at a transmission timing. The specific logical channel may be a logical channel specific to V2X communication, V2V communication, or V2P communication. The first data may be sent to the network via the uplink, or may be sent to other UEs via the sidelink. The first data may be either a V2X message or a V2P message.

In step S110, the UE determines a reception timing window based on the transmission timing. The reception timing window may be included in the active time when DRX is configured for the UE. Alternatively, the reception timing window may be included in the active time when DRX is configured on the UE for a G-RNTI or for a downlink broadcast on PDSCH or PMCH. The reception timing window may include at least one subframe, starting from a subframe which is at a time offset from the transmission timing.

In step S120, the UE monitors the reception timing window in order to receive second data. The UE may receive the second data within the reception timing window. The second data may be received from the network via the downlink, or may be received from other UEs via the sidelink. When the second data is received via the sidelink, the reception timing window may be configured for the sidelink. The second data may be either a V2X message or a V2P message.

According to the foregoing exemplary embodiment of the present invention, the above-described DRX operation of a UE may be modified as follows.

The MAC entity may be configured by RRC with a DRX functionality that controls the UE's PDCCH monitoring activity for the MAC entity's cell RNTI (C-RNTI), transmit power control physical uplink control channel RNTI (TPC-PUCCH-RNTI), TPC physical uplink shared channel RNTI (TPC-PUSCH-RNTI), semi-persistent scheduling (SPS)C-RNTI (if configured), enhanced interference mitigation and traffic adaptatio (eIMTA)-RNTI (if configured) and sidelink RNTI (SL-RNTI) (if configured). When in RRC_CONNECTED, if DRX is configured, the MAC entity is allowed to monitor the PDCCH discontinuously using the DRX operation. Otherwise, the MAC entity monitors the PDCCH continuously. RRC controls DRX operation by configuring the timers onDurationTimer, drx-InactivityTimer, drx-RetransmissionTimer (one per DL HARQ process except for the broadcast process), the longDRX-Cycle, the value of the drxStartOffset and optionally the drxShortCycleTimer and shortDRX-Cycle. A HARQ RTT timer per DL HARQ process (except for the broadcast process) is also defined.

When a DRX cycle is configured, the active time includes the time while:
    onDurationTimer or drx-InactivityTimer or drx-RetransmissionTimer or mac-ContentionResolutionTimer is running; or
    a scheduling request is sent on PUCCH and is pending; or
    an uplink grant for a pending HARQ retransmission can occur and there is data in the corresponding HARQ buffer; or
    a PDCCH indicating a new transmission addressed to the C-RNTI of the MAC entity has not been received after successful reception of a random access response for the preamble not selected by the MAC entity;
    a time window occurs when UE transmits data from a particular logical channel(s) in uplink or in sidelink.

The time window may include at least one subframe, starting from a subframe which is at a time offset from the time at which the UE sends data in the uplink or sidelink through a specific logical channel(s). The specific logical channel may be a logical channel specific to V2X communication, V2V communication, or V2P communication. For the sidelink reception, the UE may configure the time window for the sidelink and monitor only the time window in the sidelink.

When DRX is configured, the MAC entity shall for each subframe:
    1> if a HARQ RTT Timer expires in this subframe and the data of the corresponding HARQ process was not successfully decoded:
    2> start the drx-RetransmissionTimer for the corresponding HARQ process.
    1> if a DRX command MAC control element (CE) or a long DRX command MAC
    CE is received:
    2> stop onDurationTimer;
    2> stop drx-InactivityTimer.
    1> if drx-InactivityTimer expires or a DRX command MAC CE is received in this subframe:
    2> if the short DRX cycle is configured:
    3> start or restart drxShortCycleTimer;
    3> use the short DRX Cycle.
    2> else:
    3> use the long DRX cycle.
    1> if drxShortCycleTimer expires in this subframe:
    2> use the long DRX cycle.
    1> if a long DRX command MAC CE is received:
    2> stop drxShortCycleTimer;
    2> se the long DRX cycle.
    1> If the short DRX Cycle is used and [(SFN*10)+ subframe number] modulo (shortDRX-Cycle)=(drxStartOffset) modulo (shortDRX-Cycle); or
    1> if the long DRX Cycle is used and [(SFN*10)+ subframe number] modulo (long DRX-Cycle)=drxStartOffset:
    2> start onDurationTimer.
    1> during the active time, for a PDCCH-subframe, if the subframe is not required for uplink transmission for half-duplex frequency division duplex (FDD) UE operation, if the subframe is not a half-duplex guard subframe and if the subframe is not part of a configured measurement gap and if the subframe is not part of a configured sidelink discovery gap for reception; or 1> during the active time, for a subframe other than a PDCCH-subframe and for a UE capable of simultaneous reception and transmission in the aggregated cells, if the subframe is a downlink subframe indicated by a valid eIMTA L1 signalling for at least one serving cell not configured with schedulingCellId and if the subframe is not part of a configured measurement gap and if the subframe is not part of a configured sidelink discovery gap for reception; or 1> during the active time, for a subframe other than a PDCCH-subframe and for a UE not capable of simultaneous reception and transmission in the aggregated cells, if the subframe is a downlink subframe indicated by a valid eIMTA L1 signalling for the special cell (SpCell) and if the subframe is not part of a configured measurement gap and if the subframe is not part of a configured sidelink discovery gap for reception:

2> monitor the PDCCH;
2> if the PDCCH indicates a DL transmission or if a DL assignment has been configured for this subframe:
3> start the HARQ RTT Timer for the corresponding HARQ process;
3> stop the drx-RetransmissionTimer for the corresponding HARQ process.
2> if the PDCCH indicates a new transmission (DL, UL or SL):
3> start or restart drx-InactivityTimer.
1> in current subframe n, if the MAC entity would not be in active time considering grants/assignments/DRX command MAC CEs/long DRX command MAC CEs received and scheduling request sent until and including subframe n-5 when evaluating all DRX active time conditions, type-0-triggered sounding reference signal (SRS) shall not be reported.
1> if CQI masking (cqi-Mask) is setup by upper layers:
2> in current subframe n, if onDurationTimer would not be running considering grants/assignments/DRX command MAC CEs/long DRX command MAC CEs received until and including subframe n-5 when evaluating all DRX active time conditions, CQI/precoding matrix indicator (PMI)/radnk indicator (RD/precoding type indicator (PTI) on PUCCH shall not be reported.
1> else:
2> in current subframe n, if the MAC entity would not be in active time considering grants/assignments/DRX command MAC CEs/long DRX command MAC CEs received and scheduling request sent until and including subframe n-5 when evaluating all DRX active time conditions, CQI/PMI/RI/PTI on PUCCH shall not be reported.

Regardless of whether the MAC entity is monitoring PDCCH or not, the MAC entity receives and transmits HARQ feedback and transmits type-1-triggered SRS when such is expected.

Meanwhile, according to the foregoing exemplary embodiment of the present invention, the DRX operation of the UE for SC-PTM may be modified into DRX operation for MBSFN as well as for SC-PTM as described below.

Each G-RNTI of the MAC entity may be configured by RRC with a DRX functionality that controls the UE's PDCCH monitoring activity for this G-RNTI. When in RRC_IDLE or RRC_CONNECTED, if DRX is configured, the MAC entity is allowed to monitor the PDCCH for this G-RNTI discontinuously using the DRX operation. Otherwise, the MAC entity monitors the PDCCH for this G-RNTI continuously. For each G-RNTI of the MAC entity, RRC controls its DRX operation by configuring the timers onDurationTimerSCPTM, drx-InactivnyTimerSCPTM, the SC-MTCH-SchedulingCycle and the value of the SC-MTCH-SchedulingOffset. The DRX operation for SC-PTM is performed independently for each G-RNTI and independently from the conventional DRX operation. The G-RNTI may be replaced by a new RNTI.

When DRX is configured for a G-RNTI which may be applied to SC-PTM and MBSFN, the active time includes the time while:
onDuranonTimerSCPTM or drx-InactivnyTimerSCPTM is running.
a time window occurs when UE transmits data from a particular logical channel(s) in uplink or in sidelink.

The time window may include at least one subframe, starting from a subframe which is at a time offset from the time at which the UE sends data in the uplink or sidelink through a specific logical channel(s). The specific logical channel may be a logical channel specific to V2X communication, V2V communication, or V2P communication. For the sidelink reception, the UE may configure the time window for the sidelink and monitor only the time window in the sidelink.

When DRX is configured for a G-RNTI, the MAC entity shall for each subframe f or this G-RNTI:
1> if [(SFN*10)+subframe number] modulo (SC-MTCH-SchedulingCycle)=SC-MTCH-SchedulingOffset:
2> start onDurationTimerSCPTM.
1> during the active time, for a PDCCH-subframe:
2> monitor the PDCCH;
2> if the PDCCH indicates a DL transmission:
3> start or restart drx-InactivityTimerSCPTM.

Figure 9:
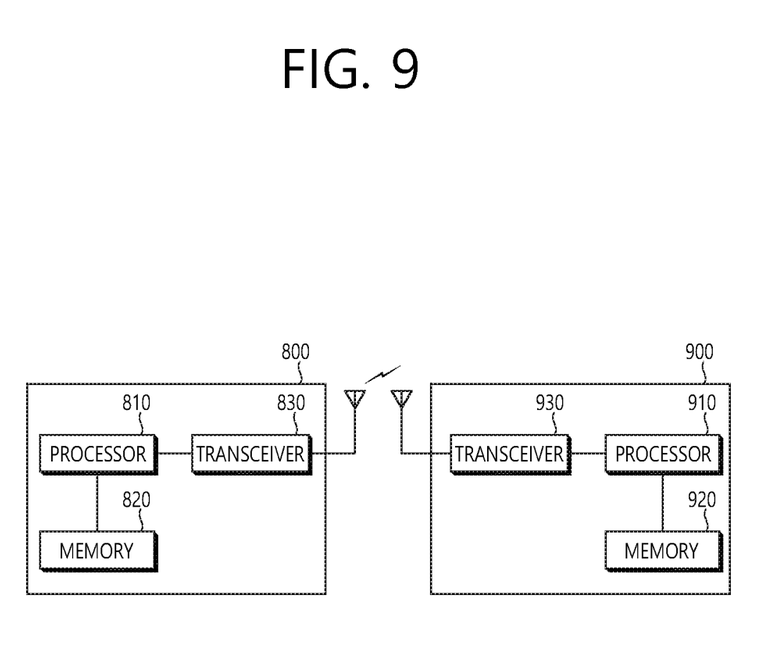
FIG. 9 shows a wireless communication system to implement an embodiment of the present invention.

FIG. 9 shows a wireless communication system to implement an embodiment of the present invention.

An eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a user equipment (UE) operating in a wireless communication system, the method comprising:
    receiving configuration of a discontinuous reception (DRX) for sidelink and downlink;
    determining a sidelink reception time window based on the configuration;
    including the sidelink reception time window in a first active time for the DRX;
    monitoring a first sidelink transmission from a second UE in the first active time for the DRX;
    performing a second sidelink transmission toward the second UE at a transmission time for data from a sidelink logical channel, wherein the sidelink logical channel is specific to vehicle-to-everything (V2X) communication;
    determining a downlink reception time window based on the transmission time and the configuration, wherein the downlink reception time window consists of time units and occurs from a time offset after the transmission time;
    including the downlink reception time window in a second active time for the DRX; and
    monitoring a physical downlink control channel (PDCCH) with a radio network temporary identity (RNTI) transmitted by the network in the second active time for the DRX.

2. The method of claim 1, wherein the DRX is configured for a group radio network temporary identity (G-RNTI) or downlink (DL) broadcast on a physical downlink shared channel (PDSCH) or a physical multicast channel (PMCH).

3. The method of claim 1, further comprising reporting, to a network, enabling a sidelink reception upon reception of the PDCCH for sidelink reception.

4. The method of claim 1, further comprising reporting, to a network, enabling a sidelink transmission upon performing the second sidelink transmission for sidelink transmission.

5. The method of claim 1, wherein the second sidelink transmission is performed within a sidelink reception time window of the second UE.

6. The method of claim 1, wherein the UE is one of a vehicle UE or a pedestrian UE.

7. A user equipment (UE) operating in a wireless communication system, the UE comprising:
    a memory;
    a transceiver; and
    a processor, operably coupled to the memory and the transceiver, and the processor is configured to:
    control the transceiver to receive configuration of a discontinuous reception (DRX) for sidelink and downlink;
    determine a sidelink reception time window based on the configuration;
    include the sidelink reception time window in a first active time for the DRX;
    control the transceiver to monitor a first sidelink transmission from a second UE in the first active time for the DRX;
    control the transceiver to perform a second sidelink transmission toward the second UE at a transmission time for data from a sidelink logical channel, wherein the sidelink logical channel is specific to vehicle-to-everything (V2X) communication,
    determine a downlink reception time window based on the transmission time and the configuration, wherein the downlink reception time window consists of time units and occurs from a time offset after the transmission time;
    include the downlink reception time window in a second active time for the DRX; and
    control the transceiver to monitor a physical downlink control channel (PDCCH) with a radio network temporary identity (RNTI) transmitted by the network in the second active time for the DRX.

8. The UE of claim 7, wherein the DRX is configured for a group radio network temporary identity (G-RNTI) or downlink (DL) broadcast on a physical downlink shared channel (PDSCH) or a physical multicast channel (PMCH).

9. The UE of claim 7, wherein the processor is further configure to control the transceiver to report, to a network, enabling a sidelink reception upon reception of the PDCCH for sidelink reception.

10. The UE of claim 7, wherein the processor is further configure to control the transceiver reporting, to a network, enabling a sidelink transmission upon performing the second sidelink transmission for sidelink transmission.

11. The UE of claim 7, wherein the second sidelink transmission is performed within a sidelink reception time window of the second UE.

12. The UE of claim 7, wherein the UE is one of a vehicle UE or a pedestrian UE.

* * * * *